(12) United States Patent
Baba et al.

(10) Patent No.: US 8,528,959 B2
(45) Date of Patent: Sep. 10, 2013

(54) FITTING ADJUSTMENT STRUCTURE FOR A LID

(75) Inventors: Naoki Baba, Tomi (JP); Junichi Yamamaru, Ebina (JP)

(73) Assignee: Johnan Manufacturing Inc., Nagano (JP)

( * ) Notice: Subject to any disclaimer, the term of this patent is extended or adjusted under 35 U.S.C. 154(b) by 135 days.

(21) Appl. No.: 13/113,263

(22) Filed: May 23, 2011

(65) Prior Publication Data

US 2011/0285165 A1    Nov. 24, 2011

(30) Foreign Application Priority Data

May 24, 2010   (JP) ................................. 2010-118729

(51) Int. Cl.
*B62D 25/00*   (2006.01)
(52) U.S. Cl.
USPC ...................................................... 296/97.22
(58) Field of Classification Search
USPC ................... 49/391, 400; 296/97.22
See application file for complete search history.

(56) References Cited

U.S. PATENT DOCUMENTS

| | | | | |
|---|---|---|---|---|
| 2,783,057 A | * | 2/1957 | Buck ............................ | 362/506 |
| 3,915,491 A | * | 10/1975 | Montgomery ............. | 296/97.22 |
| 4,527,825 A | * | 7/1985 | Clouse ........................ | 296/97.22 |
| 4,811,984 A | * | 3/1989 | Hempel ...................... | 296/97.22 |
| 5,165,749 A | * | 11/1992 | Sheppard .................... | 296/97.22 |
| 5,513,832 A | * | 5/1996 | Becker et al. ............. | 251/129.18 |
| 8,292,113 B2 | * | 10/2012 | Nakaya ......................... | 220/315 |
| 2005/0230999 A1 | * | 10/2005 | Seto ............................ | 296/97.22 |
| 2011/0285166 A1 | * | 11/2011 | Baba et al. ................. | 296/97.22 |

FOREIGN PATENT DOCUMENTS

| | | | |
|---|---|---|---|
| GB | 2041070 A | * | 9/1980 |
| JP | 7-37757 | | 7/1995 |

* cited by examiner

*Primary Examiner* — Jerry Redman

(74) *Attorney, Agent, or Firm* — Staas & Halsey LLP

(57) ABSTRACT

Provided is a fitting adjustment structure for a lid in which, before a frame and a lid are incorporated into an opening portion, a height of a stopper can be adjusted with the lid being closed, to thereby eliminate the need for adjustment after the incorporation. The fitting adjustment structure for the lid includes: the opening portion formed on a panel; the lid which turns to open and close the opening portion; and the frame which is placed along a periphery of the opening portion, and supports the lid, in which: a screw hole is pierced in the frame; a stopper having an upper surface which abuts against a rear surface of the lid in a closed state is screwed with the screw hole; and a turning operation portion engageable with a rotating tool is provided at a lower end of the stopper.

3 Claims, 4 Drawing Sheets

FITTING ADJUSTMENT STRUCTURE FOR A LID

BACKGROUND OF THE INVENTION

1. Field of the Invention

The present invention relates to a fitting adjustment structure for a lid which protects a charging port and the like provided in an electric automobile.

2. Description of the Related Art

In general, a charging port of an electric automobile or a gasoline supply port of a gasoline-powered vehicle is placed inside of an opening portion formed in a vehicle body, and the opening portion of the vehicle body is closed by an openable and closable lid.

In such a structure as described above, if an error in a closing position of the lid occurs, an outer surface of the lid and a surface of the vehicle body are not continuous with each other, and a gap between the opening portion formed in the vehicle body and an outer circumference of the lid becomes larger, so that the external appearance is deteriorated.

In view of the above, up to now, there has been proposed a fuel lid structure for a vehicle, in which: a cushion rubber is attached to a vehicle body; and a tapered concave portion which can be fitted into a leading end of the cushion rubber is formed on an inner surface of a fuel lid (see Japanese Utility Model Laid-Open No. 07-37757).

According to the conventional lid structure described above, when the fuel lid is closed, the concave portion is guided by the cushion rubber, and the lid is thus positioned, whereby a gap between an opening portion of the vehicle body and a periphery of the lid can be adjusted to be constant.

In this lid structure, it is necessary to place the concave portion of the lid and the cushion rubber at correct positions. Therefore, a hinge arm attached to the lid is temporarily tightened to the vehicle body, the lid is closed, and positioning between the concave portion and the cushion rubber is performed. After that, the lid is opened again, and the hinge arm is fixed to the opening portion.

However, according to such a positioning method, the lid is repeatedly opened and closed. Therefore, a burden on an operator is heavy, and an adjustment operation takes a long time.

SUMMARY OF THE INVENTION

The present invention has an object to provide a fitting adjustment structure for a lid in which, before a frame and a lid are incorporated into an opening portion, a height of a stopper can be adjusted with the lid being closed, to thereby eliminate the need for adjustment after the incorporation.

The present invention provides a fitting adjustment structure for a lid, including: an opening portion formed on a panel; a lid which closes the opening portion with one end of the lid being a turning center, and is urged in a closing direction; and a frame which is placed along periphery of the opening portion, and supports the lid, in which: a screw hole is pierced in the frame; a stopper having an upper surface which abuts against a rear surface of the lid in a closed state is screwed with the screw hole of the frame; and a turning operation portion engageable with a rotating tool is provided at a lower end of the stopper.

According to the present invention, a protruding amount of the stopper can be changed by an operation performed from the lower end side of the stopper, and hence the height of the stopper can be adjusted from the rear side of the lid with the lid being closed. Accordingly, when the height adjustment of the stopper is performed, it is not necessary to open and close the lid a number of times.

In addition, in the case where the height of the stopper is adjusted before the frame and the lid are incorporated into the opening portion, it is possible to save the trouble of performing, after the incorporation, the height adjustment of the stopper while opening and closing the lid.

BRIEF DESCRIPTION OF THE DRAWINGS

The above-mentioned and other objects and features of the present invention will become apparent by way of an embodiment described below with reference to the accompanying drawings. In the accompanying drawings.

DESCRIPTION OF THE EMBODIMENTS

Hereinafter, an embodiment of a fitting adjustment structure for a lid which protects a charging port of an electric automobile is described in detail with reference to the drawings.

Figure 1:
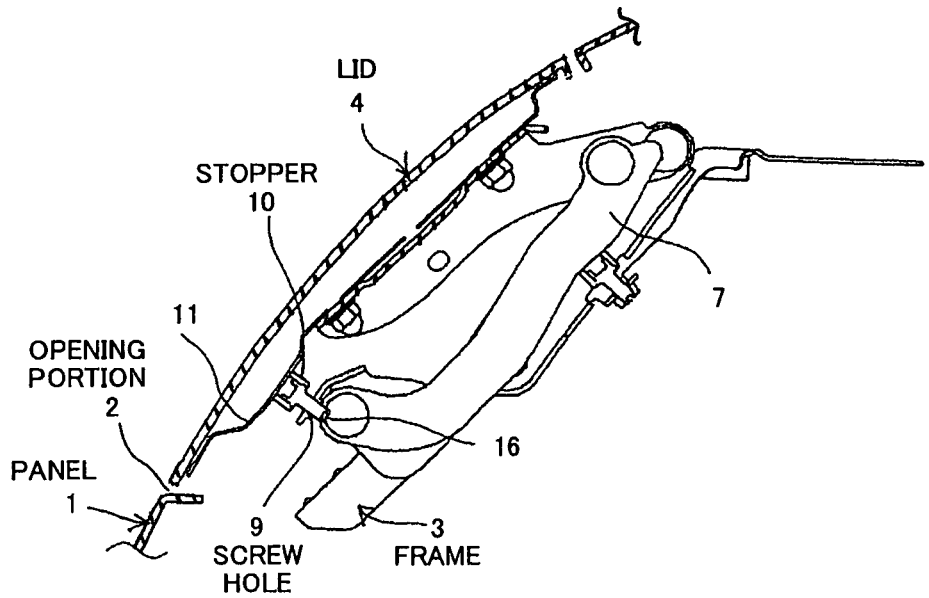
FIG. 1 is a cross sectional view illustrating an opening portion, a frame, and a lid according to an embodiment of the present invention.

As illustrated in FIG. 1, an opening portion 2 is formed on a panel 1 which constitutes a surface of a vehicle body of the electric automobile, and a charging port of a power feeding apparatus (not shown) is placed inside of the opening portion 2.

In addition, a frame 3 is placed along a periphery of the opening portion 2 below the panel 1, and a lid 4 for opening and closing the opening portion 2 is supported by the frame 3 via a link mechanism 7 so as to be movable up and down and pivotable.

Figure 2:
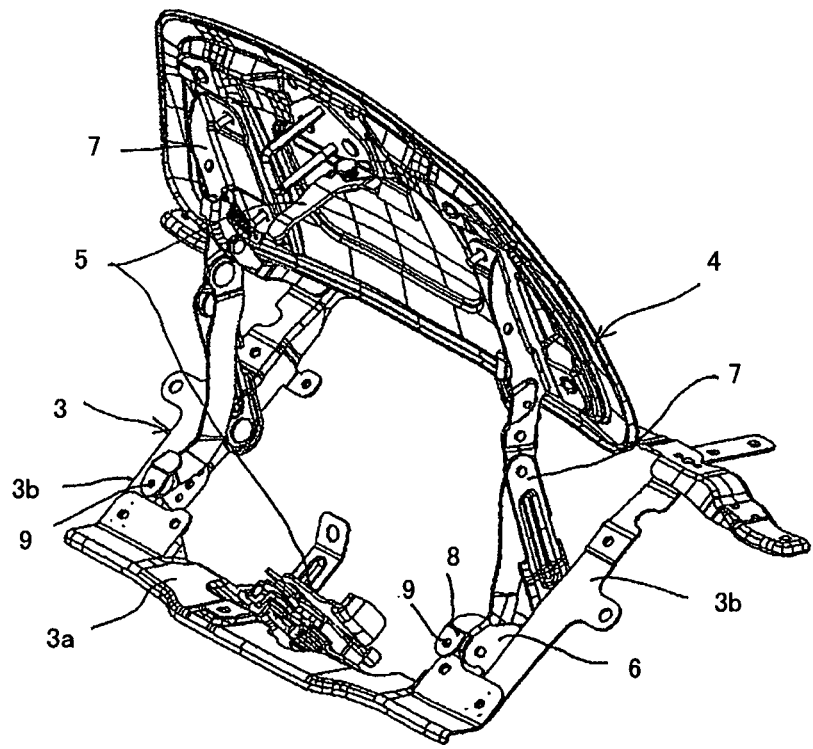
FIG. 2 is a perspective view illustrating the frame and the lid in a lid opened state according to an embodiment of the present invention.

As illustrated in FIG. 2, a lock mechanism 5 is provided in a leading end central portion of an underside of the lid 4 and a central portion of a bottom 3a of the frame 3, and a part of the lock mechanism 5 on the lid 4 side and a part thereof on the frame 3 side are engaged with each other, to thereby lock the lid 4 in a closed state.

In addition, a standing piece 6 which stands toward an outer surface of the vehicle body is integrally formed at a position close to the bottom 3a in each of right and left sides 3b of the frame 3, and one end of the link mechanism 7 is axially supported by the standing piece 6. Another end of the link mechanism 7 is axially supported by both side portions of the underside of the lid 4.

Then, when the link mechanism 7 is extended and the lid 4 pivots and moves up so as to stand with respect to the panel 1, the opening portion 2 is opened. In addition, when the link mechanism 7 is folded and the lid 4 turns and moves down so as to be parallel to the panel 1, the opening portion 2 is closed.

Figure 3:
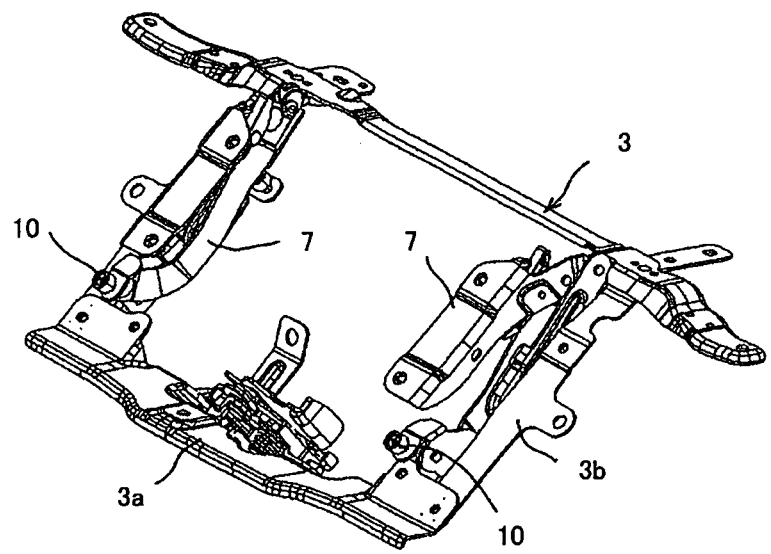
FIG. 3 is a perspective view illustrating the frame and a link mechanism in a lid closed state according to an embodiment of the present invention.

In addition, a flange 8 is formed by bending an upper end of the standing piece 6 inward, and a screw hole 9 is formed in the flange 8 so as to pass therethrough in an inner and outer direction of the vehicle body. As a result, as illustrated in FIG. 3, the screw hole 9 is formed in each of the right and left sides 3b of the frame 3. Then, a stopper 10 is screwed with the screw hole 9.

Figure 4:
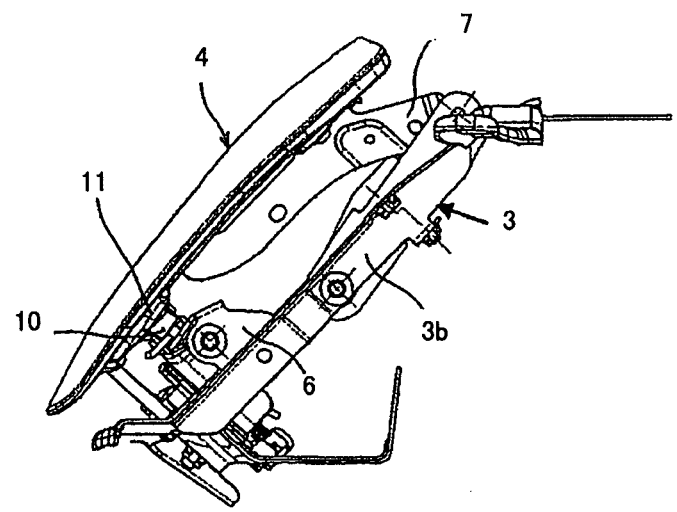
FIG. 4 is a side view illustrating the frame and the lid in the lid closed state according to an embodiment of the present invention.

As illustrated in FIG. 4, a portion 11 which protrudes from the underside surface of the lid 4 is formed on each of both sides of a leading end portion of the underside surface of the lid 4 at a position opposed to the stopper 10. With this structure, when the lid 4 is closed, an upper surface of the stopper 10 abuts against the protruding portion 11 (see FIG. 1 and FIG. 4), and hence the lid 4 is positioned so as to be flush and continuous with the panel 1.

Figure 5:
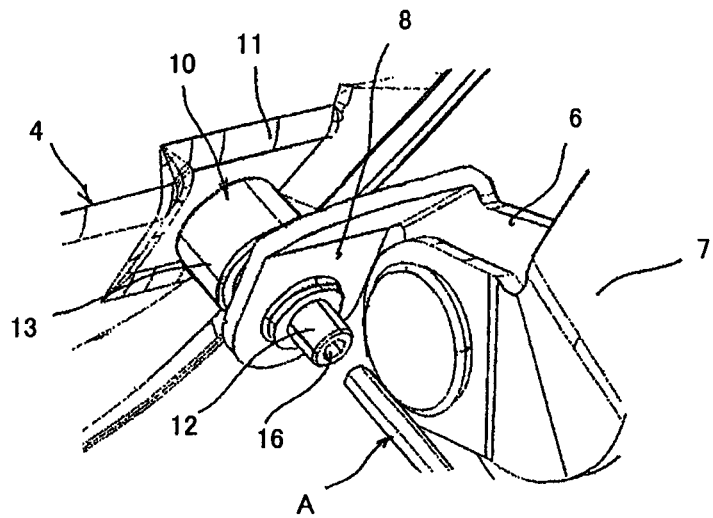
FIG. 5 is a main part perspective view observed from rear surfaces of the frame and the lid according to an embodiment of the present invention.
Figure 6:
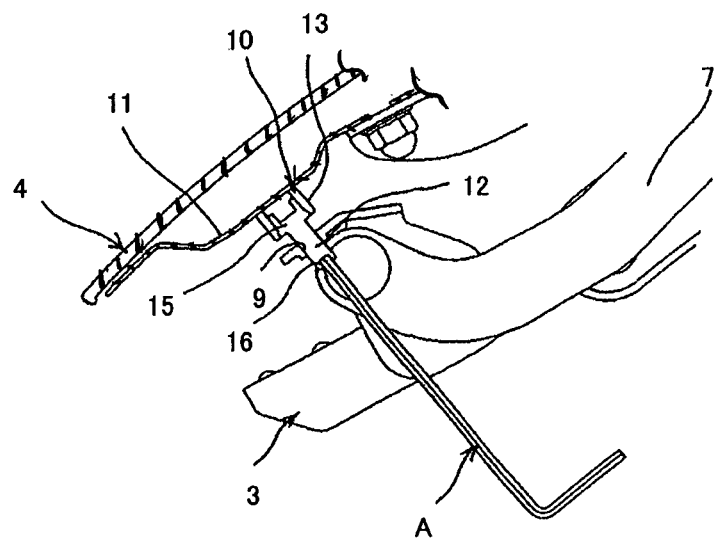
FIG. 6 is a main part cross sectional view illustrating the frame and the lid according to an embodiment of the present invention.

As illustrated in FIG. 5 and FIG. 6, the stopper 10 is formed of: a male screw member 12 which passes through the flange 8 formed in the frame 3 and is received by the screw hole 9; and a tubular elastic member 13 which is fitted with an outer surface of an upper end portion of the male screw member 12.

The male screw member 12 is preferably made of metal, and preferably includes: a shaft portion having a threaded outer circumferential surface; and a head portion 15 which is formed integrally with an upper end of the shaft portion and has a larger diameter.

In addition, a turning operation portion 16 preferably configured by a hexagon socket is formed on a lower end surface of the shaft portion 15.

The elastic member 13 is preferably formed into a tubular shape by using synthetic rubber and the like as its material, and is fitted with an outer circumference of the head portion 15 of the male screw member 12 so as to protrude upward from the male screw member 12.

Accordingly, when the lid 4 is closed, the protruding portion 11 formed on the underside of the lid 4 abuts against an upper end surface of the elastic member 13, which thus can prevent damage of the lid 4 and generation of a loud noise upon closing the lid.

In addition, when a hexagon wrench preferably serving as a rotating tool A is engaged with the turning operation portion 16 to be rotated and the male screw member 12 screwed with the screw hole 9 is accordingly turned, the stopper 10 moves up and down with respect to the frame 3, so that a height from the frame 3 to an upper surface of the stopper 10 changes.

Figure 7:
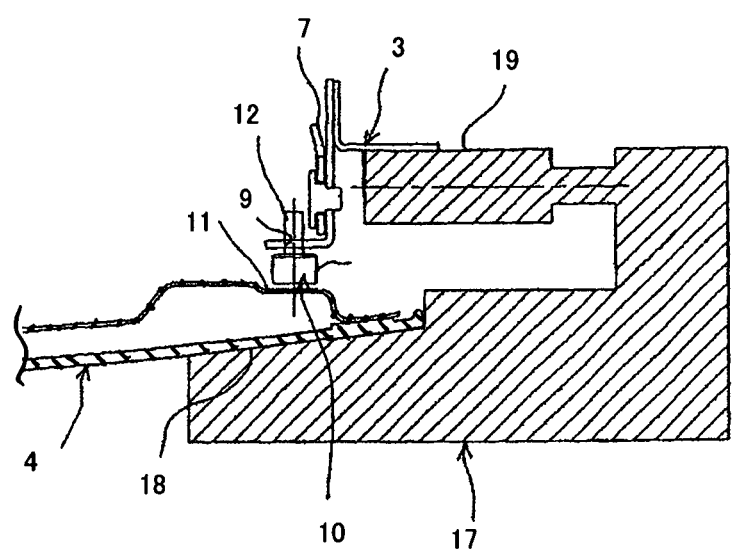
FIG. 7 is a view for describing an assembly process of the frame and the lid.

As illustrated in FIG. 7, the lid 4 and the frame 3 which supports the lid 4 are assembled with each other on a jig 17 before being incorporated into the opening portion 2. In FIG. 7 portions of the jig 17 and the lid 4 are cut array to show better how the latter is received by the former.

The jig 17 is provided with: a lid placement portion 18 which serves as a reference position of the lid 4; and a frame placement portion 19 which serves as a reference position of the frame 3 and is located in an upper lateral part of the lid placement portion 18.

Then, the lid 4 is temporarily fixed to the lid placement portion 18 of the jig 17 while being reversed, and the frame 3 is temporarily fixed upside down to the frame placement portion 19 of the jig 17. As a result, the lid 4 and the frame 3 are placed at the respective reference positions at which the lid 4 can be flush with the panel 1 when the frame 3 is attached to the opening portion 2.

It should be noted that the link mechanism 7 is attached in advance to the frame 3, and the male screw member 12 of the stopper 10 is screwed with the screw hole 9 of the frame 3 so that the elastic member 13 faces the lid 4.

In this state, the frame 3 and the lid 4 are assembled with each other via the link mechanism 7.

In addition, the rotating tool A is engaged with the turning operation portion 16 of the stopper 10 from the underside of the lid 4, and the rotating tool A is turned, whereby a protruding amount of the stopper 10 is adjusted so that an upper surface of the elastic member 13 abuts against the protruding portion 11 of the lid 4 placed at the lid reference position 18.

Next, the frame 3 and the lid 4 which are assembled with each other are removed from the jig 17, and are incorporated into the opening portion 2 of the panel 1.

The height of the stopper 10 has already been adjusted on the jig 17 before the incorporation into the opening portion 2. Therefore, after the mounting onto the vehicle body, it is not necessary to adjust the height from the outer surface of the vehicle body while opening and closing the lid 4.

It should be noted that, when the protruding amount of the stopper 10 is adjusted on the jig 17, it is possible to both protrude and retract the stopper 10 by an arbitrary amount from the position at which the elastic member 13 abuts against the rear surface of the lid 4, in accordance with a shape of the vehicle body and the like.

Such protrusion allowance adjustment of the stopper 10 as described above can be realized correctly and easily by a pitch of the screw thread of the male screw member 12 and the number of rotations of the male screw member 12. For example, if the pitch of the screw thread is 1 mm, the protrusion allowance of the stopper 10 can be increased or reduced by 1 mm by rotating once the male screw member 12 from the position at which the elastic member 13 abuts against the lid 4. In the same manner, the protrusion allowance can be adjusted by 2 mm or 3 mm by rotating twice or three times, respectively, the male screw member 12.

While the hexagon wrench is described as the rotating tool A, and the turning operation portion 16 is described as the hexagon socket, the resent invention is not limited thereto. That is, any configuration can be adopted as long as the turning operation portion 16 and the rotating tool A can be engaged with each other with a relative rotation therebetween being restricted.

What is claimed is:

1. An apparatus, comprising:
    an opening formed in an exterior of a body of a vehicle,
    a lid which is movable between a first closed position and a second open position relative to the opening, and has an outer side facing the exterior of the vehicle and an opposite underside;
    a frame at the opening that movably supports the lid;
    a hole formed through the frame,
    wherein the frame has a first side facing the underside of the lid and a second, opposite side;
    a stopper having first and second ends and a portion formed therebetween that is received in and movable relative to the hole,
    wherein, the first end of the stopper extends out of the hole towards the underside of the lid and the second end extends out of the hole away from the underside of the lid,
    wherein, when the lid is in the first closed position, the first end of the stopper is movable between a first abutting position against the underside of the lid, and a second, non-abutting position spaced from the underside of the lid,
    wherein the second end of the stopper includes a first engagement portion that engages a separate tool having a second engagement portion complimentary with the first engagement portion, which second engagement portion engages the first engagement portion from only the second, opposite side of the frame, and wherein, when the lid is in the first, closed position, the stopper is moved into the first position by the tool.

2. The apparatus as recited in claim 1, wherein the portion of the stopper is threaded, the hole is threaded to correspond to the threaded portion of the stopper, and the first engagement portion is an elastic member.

3. The apparatus as recited in claim 1, wherein the first engagement portion is hexagonal, and the second engagement portion is hexagonal.

* * * * *